United States Patent [19]

Drozd

[11] 4,318,197
[45] Mar. 9, 1982

[54] CONVEYANCE LOADER DRIVE AND STEERING SYSTEM

[75] Inventor: Otto Drozd, Hialeah, Fla.

[73] Assignee: Wollard Aircraft Equipment, Inc., Miami, Fla.

[21] Appl. No.: 96,490

[22] Filed: Nov. 21, 1979

[51] Int. Cl.³ .............................................. E01D 1/00
[52] U.S. Cl. ................................. 14/71.5; 180/6.48; 318/68
[58] Field of Search ................ 14/71.1, 71.5; 318/68; 180/333, 6.48

[56] References Cited

U.S. PATENT DOCUMENTS

| | | |
|---|---|---|
| 644,853 | 3/1900 | Fahl . |
| 803,008 | 10/1905 | Moorrees . |
| 1,038,615 | 9/1912 | Macrae . |
| 2,565,293 | 8/1951 | Avdelott .............................. 318/68 |
| 3,060,471 | 10/1962 | Der Yuen ........................... 14/71.5 |
| 3,123,167 | 3/1964 | Lichti ................................. 14/71.5 |
| 3,184,772 | 5/1965 | Moore ................................ 14/71.5 |
| 3,577,838 | 5/1971 | Van Marle .......................... 14/71.5 |
| 3,683,440 | 8/1972 | Xenakis .............................. 14/71.5 |
| 3,808,626 | 5/1974 | Magill ................................ 14/71.5 |
| 4,076,090 | 2/1978 | Krusche ............................ 180/6.48 |

OTHER PUBLICATIONS

"Basic Electrical Engineering", McGraw-Hill Book Co., Inc., 2nd ed. 1957.

Primary Examiner—Nile C. Byers, Jr.
Attorney, Agent, or Firm—Shanley, O'Neil and Baker

[57] ABSTRACT

Conveyance loading ramp has its inner end pivotally supported adjacent a building structure and the other end mounted on a mobile undercarriage having a pair of ground engaging wheels mounted one on each side of the ramp for rotation about a common horizontal axis. The undercarriage is supported for pivotal movement about a vertical axis for steering and an improved hydraulic driving and steering system includes separate hydraulic motor connected in series to drive the wheels. A first reversible variable flow control valve connected in the hydraulic circuit is operable to control both the rate and direction of flow of hydraulic fluid to the series connected motors and a second reversible variable flow valve connected in the circuit between the first valve and the hydraulic motors is operable to bypass one only of the hydraulic motors with a portion of hydraulic fluid from the first valve whereby the series connected hydraulic motors can be driven at different rates to steer the outer end of the ramp during expansion and retraction movement. A single manually actuated control connected to the first and second valves simultaneously controls both steering of the undercarriage and the direction and rate of movement of the drive motors.

8 Claims, 6 Drawing Figures

CONVEYANCE LOADER DRIVE AND STEERING SYSTEM

This invention relates generally to extendible and retractable conveyance loading ramps, and more particularly to an improved driving and steering system for moving a loading ramp between a retracted position and an extended position to accurately and reliably position the end of the ramp adjacent an access to conveyance.

It is known to provide an extendible aircraft loader ramp with mobile undercarriage support at an outer, longitudinally and laterally movable end to support the ramp for movement between retracted and extended positions. It is also known to provide means for steering such mobile undercarriage units to enable an operator to move the outer end of the ramp into and away from a loading position adjacent an aircraft door. Examples of such steerable, mobile undercarriage support units may be found in U.S. Pat. Nos. 3,060,471, 3,123,167, 3,184,722 3,462,784, 3,577,838, 3,683,440 and 3,808,626.

However, the increased length and weight of such loaders required to service, for example, modern jumbo-sized aircraft has rendered many of the prior undercarriage drive and support structures inadequate. It has been necessary to increase both the structural support provided by the undercarriage and the power to extend and retract the ramp and position the outer end of the ramp accurately with respect to the aircraft door. Reliability of the steering and drive control has become increasingly important with increased passenger use and greater awareness for passenger safety. Also the likelihood of damage to an aircraft by such large and heavy ramp structures has increased.

It is, therefore, a principle object of the present invention to provide an improved steering and drive control system for the undercarriage of an extendible conveyance loader ramp.

Another object is to provide a steerable driving system capable of accurate control for improved maneuverability to enable the outer end of the loader ramp to be quickly and reliably positioned with reference to an aircraft door.

Another object of the invention is to provide such a system which enables infinitely variable control of driving speed between zero and a predetermined maximum speed.

Another object is to provide such a system in which steering is achieved by varying the speed of two laterally spaced driving wheels.

In the attainment of the foregoing and other objects of the present invention, a wheeled undercarriage at the outer tunnel section of a multiple section extensible loader ramp is provided with a pair of laterally spaced wheels mounted for rotation about a common horizontal axis.

A separate, reversible hydraulic drive motor is provided for driving each of the undercarriage wheels. Hydraulic circuit means, including a driven hydraulic pump, is provided to supply pressure fluid to the wheel motors through a single drive control or throttling valve operable to control both the direction and rate of flow to the wheel motors. The wheel motors are connected in series with steering control valve means provided for varying the rate of flow through the motors relative to one another to control steering. A separate reversing valve connected to only one of the wheel motors enables pivotal movement of the undercarriage about a vertical axis without movement of the ramp. The accurate steering control for the hydraulic system enables maneuvering of the loader ramp at extremely low speeds to substantially eliminate the danger of damage to an aircraft by the ramp, while at the same time permittting accurate control at higher operating speeds as when approaching or withdrawing from an aircraft.

These and other contributions and advantages of the invention are considered in the following detailed description presented in conjunction with the accompanying drawings, in which.

Figure 1:
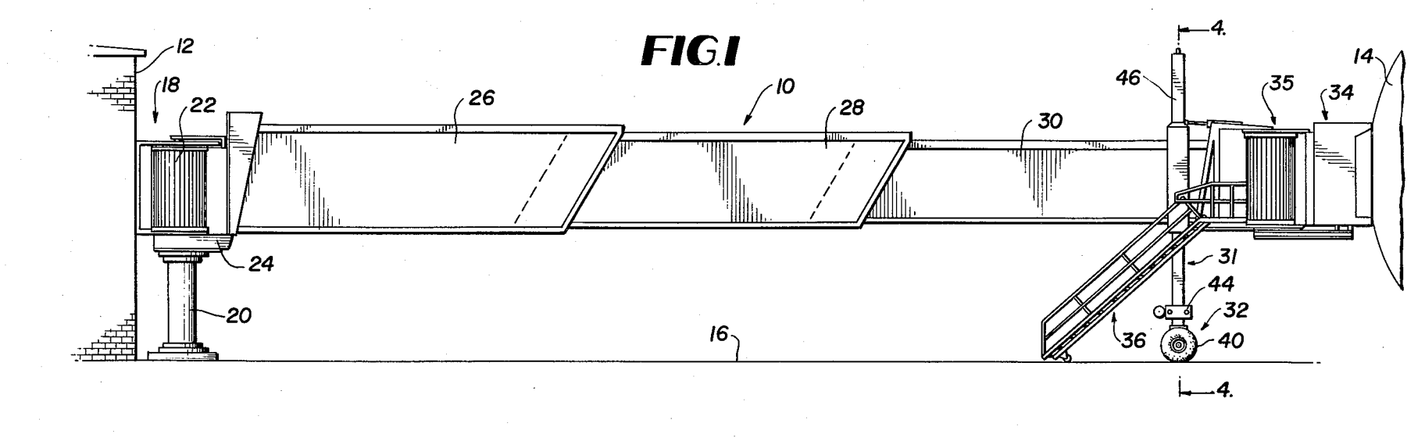
FIG. 1 is a side elevation view of a conveyance loader embodying the present invention.
Figure 2:
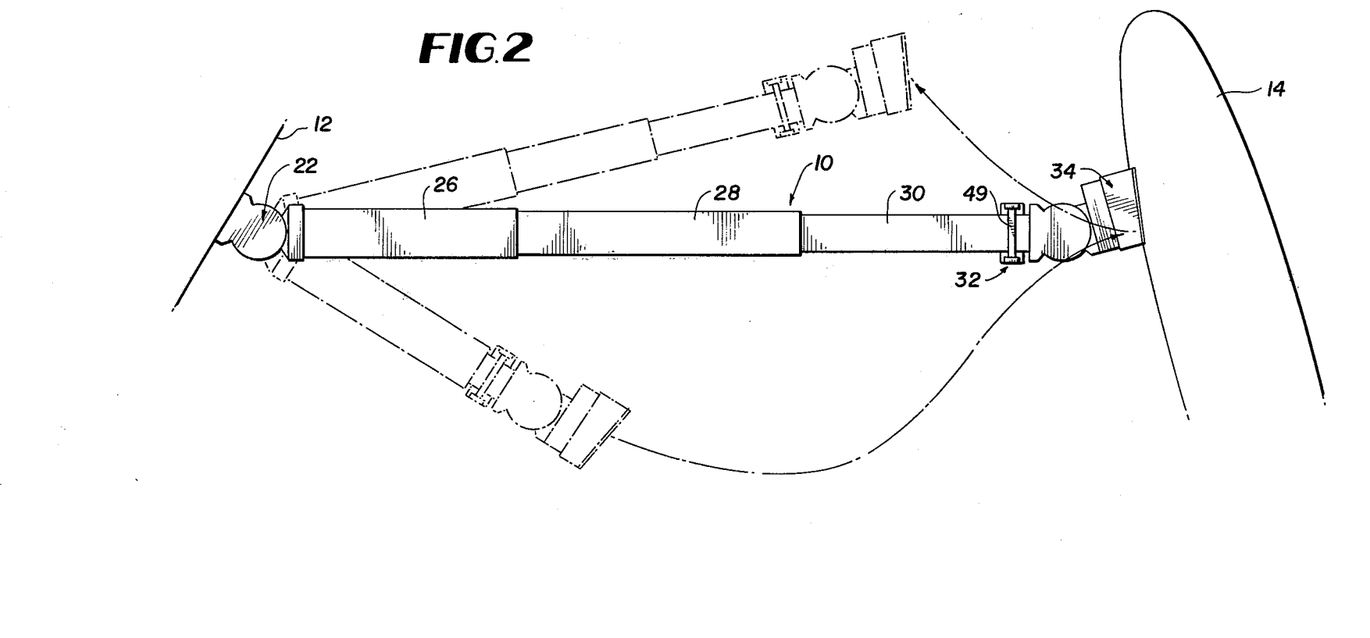
FIG. 2 is a schematic plan view showing the loader in various positions, with a typical path between the positions being illustrated by a broken line.

A retractable conveyance loading ramp 10 is illustrated in FIG. 1 as extending between a terminal building 12 and an aircraft 14 parked on an apron adjacent the terminal building.

The inner end of the ramp is supported by a pivotal mounting structure 18 and includes a pedestal 20 providing fixed position support for a terminal vestibule 22. Platform 24 is rotatably mounted on pedestal 20 and supports a floor member for a vestibule 22 which in turn provides support for the inner end of inner tunnel section 26. Such support provides for rotation about a vertical axis and for pivotal movement about a horizontal axis at pedestal 20. This support and terminal vestibule structure may be of conventional construction.

The major longitudinally extended portion of the loading ramp comprises inner tunnel section 26, intermediate tunnel section 28, and outer tunnel section 30. The tunnel sections are received within one another providing for simultaneous proportional telescoping movement to expand and retract along the longitudinal dimension of the loader. The outer end of the ramp is supported by a loader elevator 31 and an undercarriage assembly 32. An aircraft vestibule 34 is mounted for rotation about cab structure 35 at the outer end of tunnel section 30 outboard of the elevator and undercarriage assembly. An access ladder 36 may be employed to provide access to the outer cab structure 35 and aircraft vestibule 34 from the apron 16.

Figure 3:
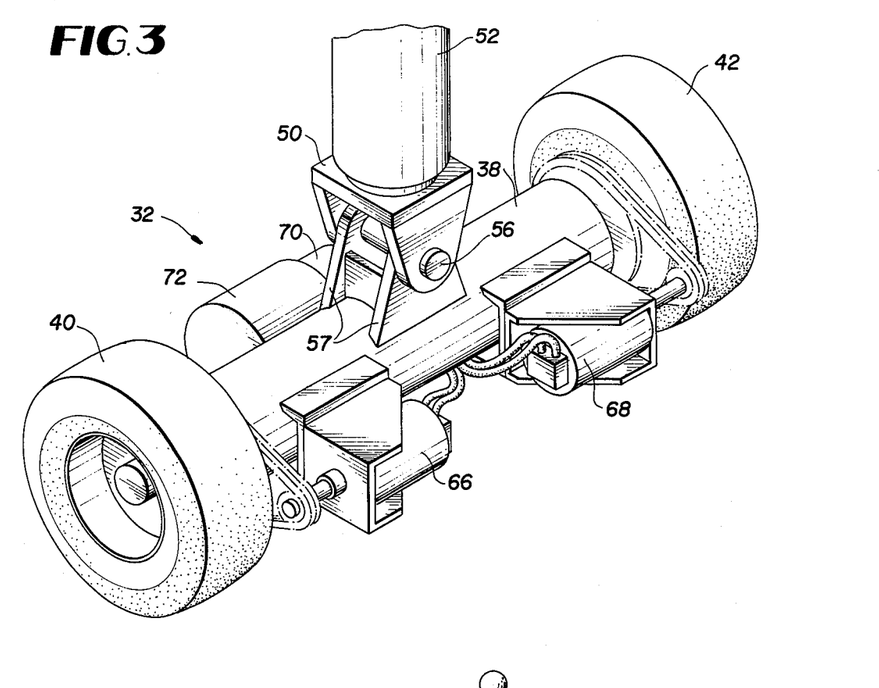
FIG. 3 is a perspective view of a portion of the conveyor showing the wheeled undercarriage used to support the outward end of the loader.

The undercarriage assembly 32 is seen more clearly in FIG. 3. A rigid transverse axle structure 38 is supported by a pair of laterally spaced wheels 40, 42 mounted one on each end of the axle structure for rotation about a common horizontal axis.

Figure 4:
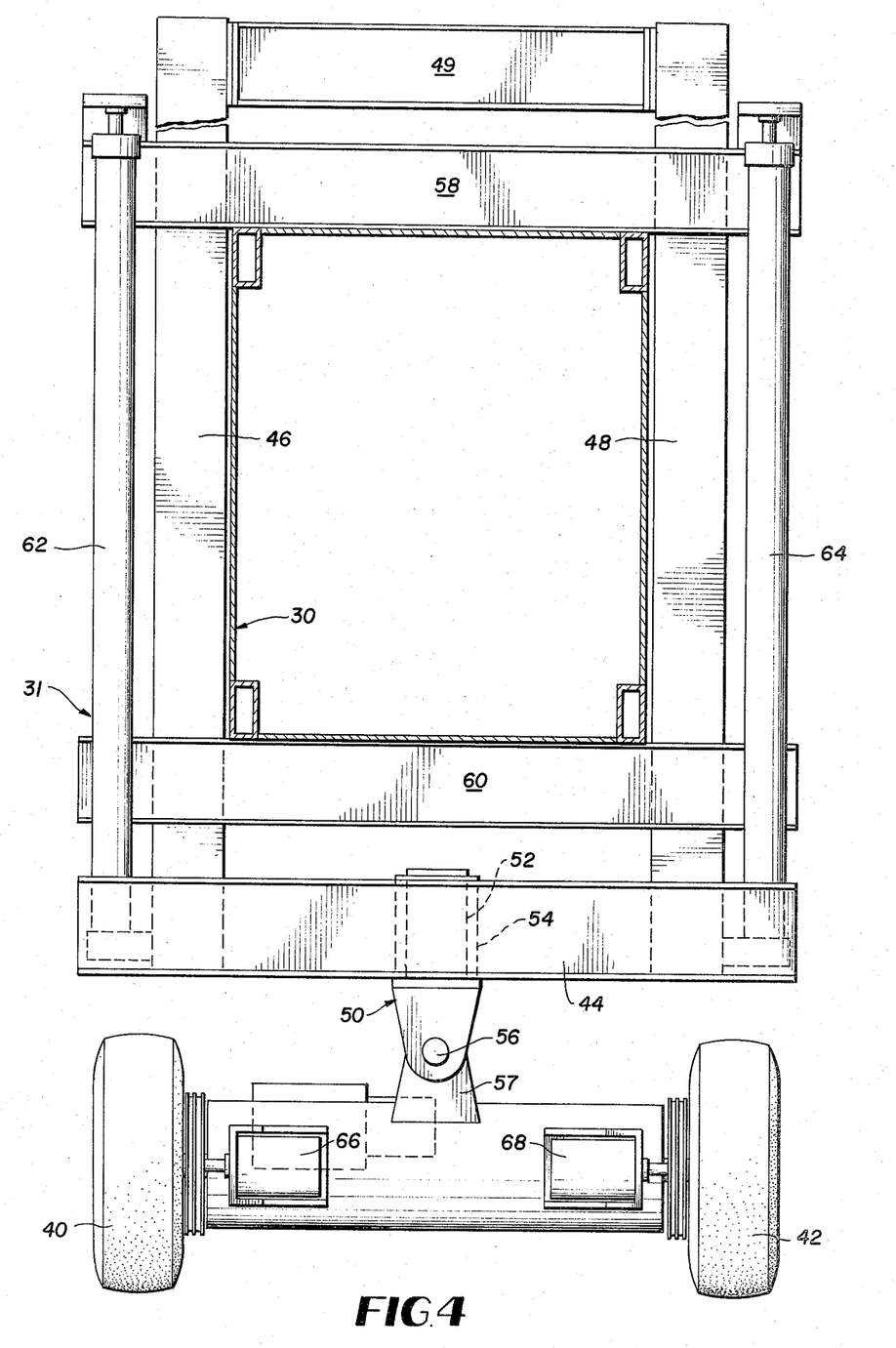
FIG. 4 is a fragmentary section view taken on line 4—4 of FIG. 3.

A rigid, open-centered generally rectangular frame structure as best seen in FIG. 4, includes a horizontal base frame member 44, a pair of vertically extending, laterally spaced guide members 46, 48 and a top horizontal frame member 49. Bolster assembly 50 mounts this frame structure on axle 38 and is equally spaced between wheels 40, 42. Bolster assembly 50 has a vertical pivot pin 52 extending into a cylindrical guide sleeve in horizontal frame member 44 and is pivotally mounted on the transverse axle 38 by pin means 56 and brackets 57 for limited pivotal movement about a horizontal axis extending above and transversely of the axle.

Guides 46, 48 receive and support the lower end portions of a pair of vertical frame members 58, 60 rigidly mounted one on each side of the outer end portion of outer tunnel section 30. A pair of hydraulic cylinders 62, 64 are provided for moving the structural frame members 58, 60 vertically along guides 46, 48, respectively, to raise or lower the outer end of the loader 10 as desired to accurately locate vestibule 34 vertically with respect to the door of aircraft 14. Since frame members 58, 60 are rigidly mounted on the outer tunnel section, and since these members are snugly received for sliding movement in the guide members 46, 48, the telescoping loader can be moved longitudinally of itself, within limits provided by suitable stops, by driving the wheels 40, 42 about their common axis. The guides 46, 48 and frame members 58, 60 cooperate to maintain the elevator and undercarriage assembly 32 in an upright position and transfer the driving load of the wheels to the outer tunnel section.

Reversible hydraulic motors 66, 68 are mounted on the axle structure 38. Motor 66 is connected to wheel 40 and motor 68 is connected to wheel 42 to drive the wheels about their common axis. A variable delivery hydraulic pump 70, driven by an electric motor 72 (FIG. 3), is also mounted on axle structure 38 to supply fluid to the motors 66, 68 and to hydraulic cylinders 62, 64.

Figure 5:
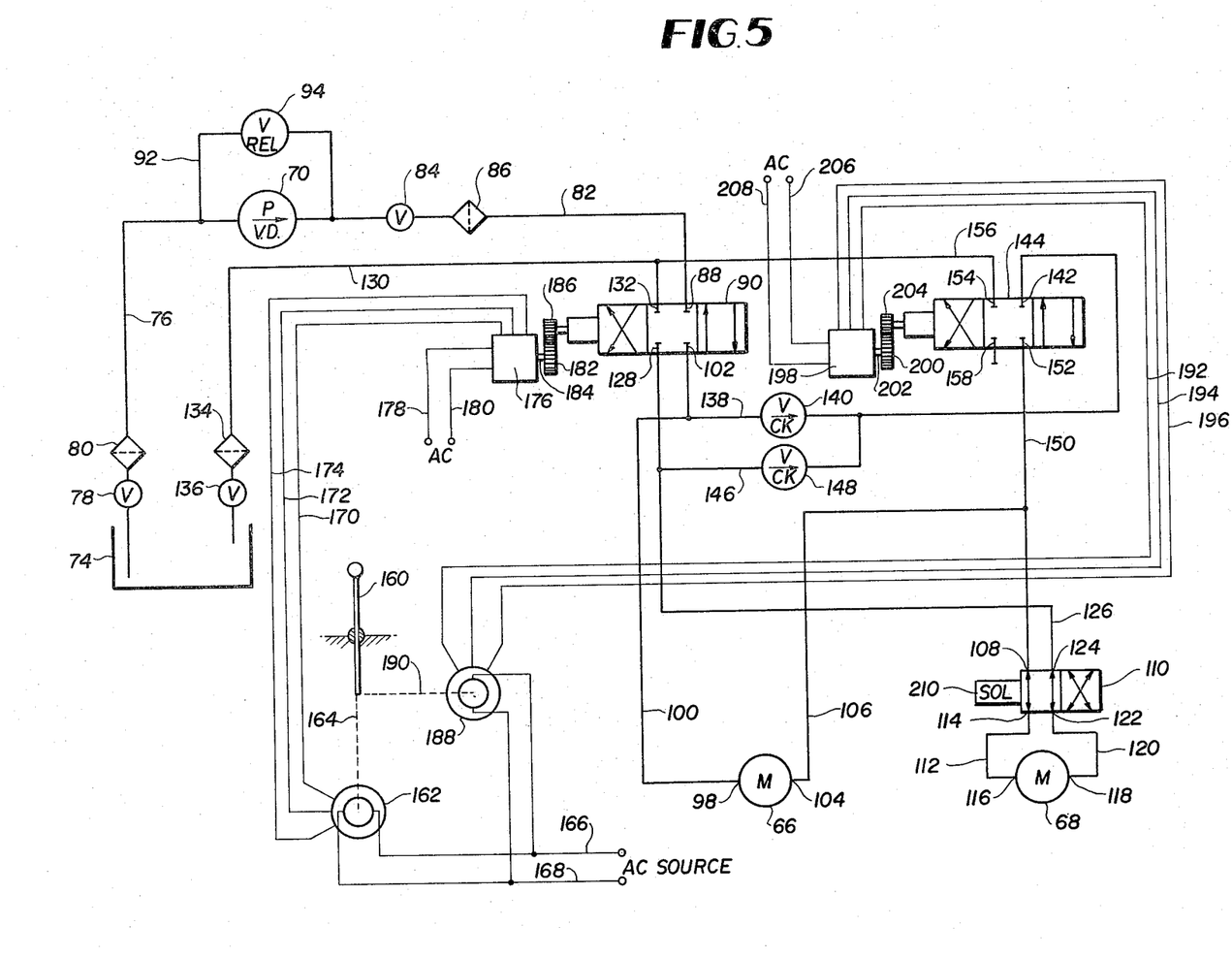
FIG. 5 is a schematic view of the hydraulic drive and steering control system used in the apparatus.

As schematically illustrated in FIG. 5, the hydraulic drive and steering control system for the undercarriage assembly includes the pump 70 which supplies hydraulic fluid from a reservoir 74 to the wheel motors 66 and 68. An inlet or suction line 76, including a cut-off valve 78 and filter 80 extends from the reservoir to the inlet side of pump 70. Pressure line 82 is connected to the outlet of pump 70 and includes cut-off valve 84 and a filter 86. Pressure line 82 connects the pump outlet to inlet port 88 of a variable flow, three-position four-way steering control and throttling valve 90.

A bypass line 92 including pressure relief valve 94 can be connected between suction line 76 and pressure line 82 adjacent the inlet and outlet of pump 70.

Reversible wheel motor 66 has one port 98 (sometimes referred to herein as an inlet port) connected through line 100 to port 102 of valve 90. Port 104 of motor 66 (sometimes referred to as an outlet port) is connected through line 106 to port 108 of a two-position, four-way solenoid actuated reversing valve 110. Line 112 is connected between port 114 of valve 110 and the inlet port 116 of wheel motor 68, while outlet port 118 is connected through line 120 to port 122 of valve 110. Port 124 of reversing valve 110 is connected through line 126 to the port 128 of control valve 90, and a return line 130, connected to port 132 of valve 90, is provided to return hydraulic fluid, through filter 134 and cut-off valve 136, to reservoir 74.

Port 102 is also connected through a line 138, which includes one-way check valve 140, to a port 142 in a three-position, four-way variable flow steering control valve 144. A second line 146 connects line 126 to line 138, through a second one-way check valve 148. Line 146 is connected between the check valve 140 and the control valve 144. Also, line 150 connects line 106 to port 152 of valve 144 while port 154 is connected, through return line 156, to return line 130. Port 158 of valve 144 is blocked.

Control valves 90 and 144 are both preferably rotary spool valves having closed centers so that, when the spools are in the centered or null position, no fluid can flow through the valves. This condition of both valves is illustrated in FIG. 5 of the drawings so that, with hydraulic pump 70 energized and pumping fluid and valve 84 open, line 82 is pressurized but no fluid is flowing in the drive system. In this condition, the pump discharge flows through bypass 92 and relieve valve 94 back to the pump inlet.

Rotation of valve 90 in one direction will shift the valve spool to permit flow straight through the valve as schematically illustrated in the right hand end of the valve. In this position, port 88 is connected to port 102 and port 128 is connected to port 132 so that pressure fluid from line 82 flows directly through the valve to line 100. With steering valve 144 in the centered position, the entire flow through port 102 and line 100 will flow through inlet 98 of wheel motor 66 and out through line 106 to wheel motor 68. With reversing valve 110 in its normal deenergized position, hydraulic fluid flowing through line 106 passes into port 108 and out port 114 of valve 110 then through line 112 to inlet 116 of wheel motor 68 and be discharged through outlet 118 and line 120 to return through ports 122 and 124 of valve 110 and line 126 to control valve 90. The flow in line 126 will pass through ports 128 and 132 and be returned to the reservoir through return line 130.

In the condition of the system just described, wheel motors 66 and 68 are connected in series and will be driven at the same rate and in the same direction since all hydraulic fluid flowing in the system passes through both motors in the same direction, for example, in a direction to move the carriage to extend the ramp. Also, it is pointed out that the direction of rotation of the spool of throttling valve 90 controls the direction of flow of fluid therethrough, i.e., straight through or cross flow, while the extent of rotation controls the volume of flow in a manner well known in the valve art.

In order to reverse the direction of rotation of wheel motors 66 and 68, and thereby move the wheeled undercarriage in a direction to retract the loading ramp, spool of valve 90 is rotated in the opposite direction, i.e., the direction to produce cross flow as indicated schematically at the left end of the valve in FIG. 5. In this condition, pressure line 82 is connected through ports 88 and 128 to the line 26 for flow straight through valve 110 and through wheel motor 68 in the direction from outlet port 118 to inlet port 116. From motor 68, the fluid flows through line 112 valve 110 and line 106 to the outlet 104 of motor 66 to drive the motor in the reverse direction. From motor 66 the fluid flows through inlet 98 and line 100 to be returned through ports 102 and 132 of valve 90 to the return line 130.

The positioning of throttling valve 90, and of steering valve 144 is preferably controlled by a single joy stick actuator illustrated schematically at 160 in FIG. 5. The joy stick 160 is employed to control the rotor position of first selsyn transmitter 162, through a suitable mechanical linkage indicated schematically at 164 in FIG. 5 and described more fully hereinbelow with reference to FIG. 6. AC power is supplied, from a suitable source not shown, to the rotor of transmitter 162 through wires 166, 168. The stator of transmitter 162 is connected, via a conventional selsyn circuit indicated by the three wires 170, 172 and 174 to a selsyn receiver or motor 176 which, in turn, has its rotor connected to the AC source through wires 178, 180. A gear 182 mounted on the output shaft 184 of selsyn receiver 176 engages a gear 186 mounted on the spool of rotary throttling valve 90 so that any rotation of selsyn receiver 176 produces a corresponding movement of the control valve. Thus, movement of joy stick 160 along one axis, for example, forward or rearward, will produce corresponding movement of the actuator 164 to drive the selsyn transmitter 162 which produces corresponding driving movement of selsyn motor 176 to thereby position valve 90.

A second selsyn transmitter 188 is connected through a suitable linkage indicated schematically at 190 in FIG. 5 and described more fully hereinbelow with reference to FIG. 6, to the joy stick 160 for actuation thereby. Actuator linkage 190 extends at right angles to linkage 164 so that movement of the joy stick in a direction perpendicular to movement required for actuation of transmitter 162 will actuate the transmitter 188. Transmitter 188 has its stator windings connected, through standard selsyn circuit represented by the three wires 192, 194 and 196, to a selsyn receiver motor 198 having its rotor connected to a drive gear 200 through shaft 202. Gear 200 meshes with and drives a second gear 204 mounted on the rotary spool of steering valve 144 so that rotation of the stator of selsyn motor 198 in response to corresponding driving movement of selsyn transmitter 188 in either direction produces a corresponding rotation of valve 144. The rotor of selsyn transmitter 188 is connected to an AC source through the wires 166, 168, and the rotor of receiver 198 is connected to an AC source by wires 206, 208.

Actuation of steering valve 144 operates to bypass a part of the hydraulic fluid flowing through one or the other of the drive motors 66, 68, depending upon the direction of movement of the valve and open the position of throttling valve 90. The amount of fluid bypassed by valve 144 depends upon the extent of movement of the valve. Thus, with the drive control valve 90 in the straight through flow position (described above as being the forward movement position) and with the steering control valve 144 in the centered position shown in FIG. 5, motors 66 and 68 will be driven in the same direction at exactly the same rate so long as pivot valve 110 is in its normal, straight through flow position since in this condition motors 66 and 68 are connected in series in the hydraulic system. However, movement of the joy stick to the operator's left or right will produce a corresponding movement of steering valve 144 to produce an increased or a decreased flow through one of the wheel motors, thereby causing one of the wheels to be driven faster than the other. Thus, with the loading ramp moving forward, or in a direction to extend its length, movement of the joy stick to the right will shift valve 144 to the straight through flow condition illustrated at the right end of the valve in FIG. 5 so that ports 142 and 152 are connected. This permits a portion of the hydraulic drive fluid flowing in line 100 to be bled off through one-way check valve 140 and line 138 to flow through steering valve 144 to line 150. The remainder of the hydraulic fluid flows through line 100 and motor 66 into line 106 where it is recombined with the fluid flowing in line 150. The combined flow then passes through motor 68 to drive wheel 42 at a greater rate than wheel 40. The extent of this difference in rate will, of course, depend upon the extent of steering movement of the joy stick 160 and consequently of the valve 144 which controls the amount of fluid bypassing motor 66.

With the position of throttling valve 90 remaining unchanged, shifting the joy stick to the operator's left will move steering control valve 144 to the cross flow condition illustrated at the left of the valve in FIG. 5 so that ports 152 and 154 are connected, and port 142 is connected to the blocked port 158. In this condition, flow through line 138 is blocked by the steering valve so that all hydraulic fluid flowing through valve 90 must pass through line 100 and wheel motor 66 to line 106. However, a portion of the fluid in line 106 is then bled off through line 150 and steering control valve 144 to return line 156 so that wheel motor 68 is driven at a slower rate than wheel motor 66. Again, the extent of the difference in drive speeds depends upon the extent of actuation of the steering control valve 144.

When joy stick 160 is shifted rearward to move drive control valve 90 to the reverse or cross flow position illustrated schematically at the left end of the valve in FIG. 5, hydraulic fluid from line 82 passes first through wheel motor 68 then wheel motor 66, with these motors again being connected in series to rotate at the same rate when steering valve 144 is in the center position. Shifting steering valve 144 to the straight through flow condition by moving of the joy stick 160 to the right, as described above, will still produce an effect on the operation of the wheel motors resulting in a steering of the undercarriage support to the right. Thus, hydraulic fluid from line 82 flows through valve 90 into line 126 to pass through wheel motor 68 from outlet 118 to inlet 116 to line 106. However, one-way check valve 148 permits a portion of the fluid in line 126 to be bled off through line 146 and 140 to pass straight through steering valve 144 to line 150. This portion of the fluid which is bled off from line 126 thus bypasses wheel motor 68 and flows through line 150 to be recombined with the fluid flowing from motor 68 in line 106 before entering the outlet port 104 of motor 66. This results in wheel motor 68 being driven in reverse at a slower rate than wheel motor 66 so that the loading ramp is again steered to the right by shifting the joy stick to the right as the ramp is driven in reverse.

With steering control valve 90 still in the position to drive the ramp in reverse, movement of the joy stick to the left to shift steering valve 144 to the cross flow position described above results in line 150 being connected to return line 156, through ports 152 and 154 of the steering valve. In this position, all of the hydraulic fluid flowing through throttling valve 90 first passes through wheel motor 68 and then is divided with a portion being bled off through line 150 to be returned to the sump and the remainder flowing through wheel motor 66 before being returned to the sump. Thus, wheel motor 68 is driven at a greater rate than wheel motor 66, resulting in a steering of the ramp to the left as it is driven in reverse.

An important contribution of the invention is providing for infinite variety in steering control through a hydraulic drive circuit of minimized and simplified structures in which a single joy stick control is employed to actuate two valves which function to control drive speed and steering both in the forward and reverse direction of movement of the ramp. Further, actuation of the joy stick to control steering is the same regardless of whether the ramp is being extended or retracted so that accurate control is provided from a natural steering control movement and a minimum of experience and training is required to enable an operator to reliably position the ramp.

In the hydraulic control system described thus far, steering movement is dependent upon driving movement of the wheel motors. However, it is sometimes desired to move the outer end of a ramp laterally in either direction, without either extending or retracting the ramp. To enable such selected movement, pivot valve 110 is connected in lines 106 and 126. As described above, this valve is a two-position, four-way valve which is normally spring-biassed to the straight through position illustrated in FIG. 5 and solenoid actuated to the cross flow position illustrated schematically at the right end of this valve in the drawing. When actuated, valve 110 shifts to connect port 108 to port 122 and port 114 to port 124. In this condition, hydraulic fluid flows through wheel motors 66 and 68 in opposite directions, regardless of whether drive control motor is in the forward or reverse drive mode. Also, the control circuit for the solenoid of valve 110 is preferably connected in the circuits supplying power to the selsyn transmitter 188 so that, when solenoid 210 is energized, steering valve 144 is returned to the centered position. In this condition, all hydraulic fluid flowing in the circuit passes through both wheel drive motors to drive them at the same rate in opposite directions. This pivots the undercarriage about a vertical axis located midway between the two ground engaging wheels 40 and 42 without moving the ramp. Limit switches, not shown, are preferably provided to limit this pivotal movement of the undercarriage to some preselected limit, for example slightly more than 90° to either direction from the straight forward or reverse drive position.

Thus, when the undercarriage is shifted to its maximum pivot position, the common axis of wheels 40, 42 extends parallel to the longitudinal axis of the ramp, and driving movement of the wheels will result in movement of the ramp about pivotal support 18 at the terminal building end of the ramp without requiring extension or retraction of the ramp. After the undercarriage is pivoted to the desired position, valve 110 can be deenergized to return the control system to its normal operating mode for the pivotal or other movement of the ramp as desired.

Figure 6:
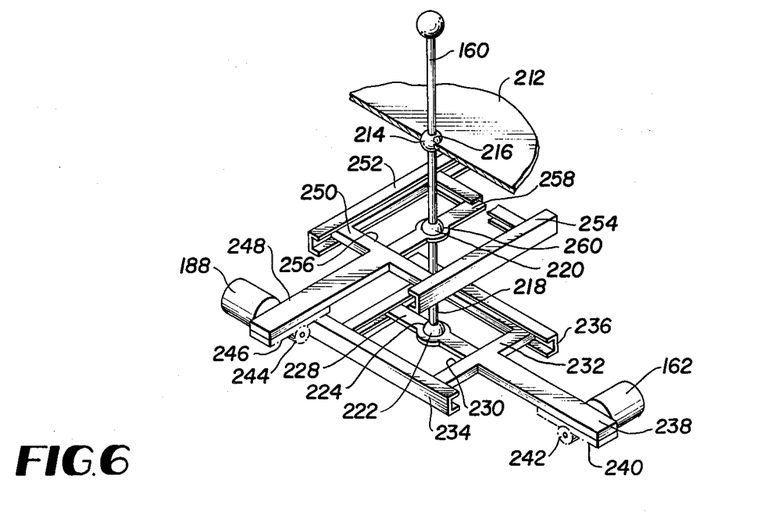
FIG. 6 is an exploded perspective view of the joy stick control for the drive and steering control system shown in FIG. 5.

The joy stick control or the hydraulic system is illustrated schematically in FIG. 6 as including the joy stick lever 160 universally mounted intermediate its ends in an opening in a control panel 212 located in the airplane vestibule 34. Lever 160 has a mounting ball 214 integrally formed with or rigidly mounted thereon intermediate its ends which is received in a spherical socket 216 to form a ball-and-socket support permitting pivotal movement of the lever in any direction. The portion 218 of lever 160 which projects below the control panel 212 extends through and is slidably received in cylindrical bores in a pair of vertically spaced spherical ball members 220, 222, respectively, supported in spherical sockets 224, 226, respectively. Spherical socket 224 is carried in a plate member 228 slidably mounted in a rectangular opening 230 of a second plate member 232 which, in turn, is slidably mounted for movement along a pair of guide tracks 234, 236. Plates 228 and 232 are thus supported for free sliding movement in a common plane at right angles to one another, with the portion 218 of lever 160 being free to slide vertically through the cylindrical opening in the spherical ball 222. An elongated arm 238 projects outwardly from plate 232 and supports a gear rack 240 for engaging and driving a pinion 242 on the rotor of selsyn transmitter 162.

A second pinion 244 mounted on the rotor of selsyn transmitter 188 is engaged and driven by a rack 246 carried by an arm 248 on sliding plate 250 which, in turn, is slidably mounted by tracks 252, 254 for straight line reciprocal movement in a direction perpendicular to the movement of plate 232. Plate 250 similarly has a rectangular opening 256 which slidably supports a plate member 258 having a spherical socket 260 formed therein rotatably mounting the spherical ball 220. Thus, it is seen that manual movement of the lever 160 will cause simultaneous movement of the two spherical balls 220, 222. However, only the component of movement of the lower end portion 218 of lever 160 which is parallel to tracks 234, 236 will result in displacement of the plate 232, and the rack 240 supported thereby, with any component of movement perpendicular to the tracks 234, 236 merely producing sliding movement of the plate 228 within the rectangular opening 230. Similarly, only the component of movement of the section 218 of lever 160 which is parallel to the tracks 252, 254 results in movement of rack 246 to actuate the pinion 244 on selsyn transmitter 188. This simple single actuator control system provides a positive control which is easy and natural to operate to control both linear movement, to extend or retract the ramp, and steering of the ramp during such movement. For example, an operator standing in the airplane vestibule and facing away from the terminal building merely has to move the joy stick control in the direction in which it is desired to move the outer end of the ramp. For example, movement away from the operator and to his right will extend the ramp and simultaneously steer it to the right while movement toward the operator and to his right will cause the ramp to be retracted and steered to the right. Thus, the advantages of easy operation are combined with positive control, particularly at low speeds, obtained by the hydraulic drive system.

Various modifications to the described structure and their positioning could be made in the light of the above teachings without departing from the scope of the invention. For example, while the use of a selsyn control system to transmit the steering and drive control signals from the joy stick control in the airplane vestibule to the undercarriage drive system is disclosed, other known means can be used. For example, direct mechanical linkages, fluidics, or electrical bridge circuits may be employed to transmit the joy stick control signals to the drive control and steering valves. Also, the hydraulic and steering control valves can be located in the airplane vestibule console or on the undercarriage structure, as described. Therefore it is to be understood that all embodiments which would be apparent to one skilled in the art and which come within the spirit and scope of my invention are covered by the appended claims.

I claim:

1. Conveyance loading apparatus comprising
an extensible and retractable loading ramp having an inner end pivotally supported at a positionally fixed structure and an outer end mounted on a mobile undercarriage having a pair of ground engaging wheels mounted, with one wheel contiguous to each lateral side of the ramp, for rotation about a common axis, and
drive means operable to drive the ground engaging wheels to move the outer end of the loading ramp between extended and retracted positions and to steer the outer end of the ramp during such movement, the drive means comprising, a pair of hydraulic motors drivingly connected one to each of the pair of ground engaging wheels, the hydraulic motors each having an inlet and an outlet, pump means for supplying hydraulic fluid under pressure to the pair of hydraulic motors, hydraulic circuit means including conduit means connecting the pair of hydraulic motors in series to the pump means, a first reversible, variable flow valve connected in the hydraulic circuit means and operable to control both the rate and direction of flow of hydraulic fluid from the pump means to the pair of series connected hydraulic motors, a second reversible, variable flow valve connected in the hydraulic circuit means between the first valve and the pair of hydraulic motors, such second valve being operable to divide the flow of fluid from the first valve and to bypass only one of the hydraulic motors with a portion of such fluid whereby the series connected hydraulic motors can be driven at different rates to steer the outer end of the ramp during expansion and retraction movement, and a single actuator control means operably connected to the first and second valve means to simultaneously control both steering and driving rate of the outer end of the ramp.

2. The apparatus of claim 1 wherein the single actuator control means comprises a joy stick type control lever and means operably connecting the first and second valves to such control lever for simultaneous operation.

3. The invention as defined in claim 1 wherein the first and second valves are closed center rotary spool valves.

4. Conveyance loading apparatus comprising
an extensible and retractable loading ramp having an inner end pivotally supported at a positionally fixed structure and an outer end mounted on a mobile undercarriage having a pair of ground engaging wheels mounted, with one wheel contiguous to each lateral side of the ramp, for rotation about a common axis, and drive means operable to drive the ground engaging wheels to move the outer end of the loading ramp between extended and retracted positions and to steer the outer end of the ramp during such movement, the drive means comprising, a pair of hydraulic motors drivingly connected one to each of the pair of ground engaging wheels, the hydraulic motors each having an inlet and an outlet, pump means for supplying hydraulic fluid under pressure to the pair of hydraulic motors, hydraulic circuit means including conduit means connecting the pair of hydraulic motors in series to the pump means, a first reversible, variable flow valve connected in the hydraulic circuit means and operable to control both the rate and direction of flow of hydraulic fluid from the pump means to the pair of series connected hydraulic motors, a second reversible, variable flow valve connected in the hydraulic circuit means between the first valve and the pair of hydraulic motors, such second valve being operable to divide the flow of fluid from the first valve and to bypass only one of the hydraulic motors with a portion of such fluid whereby the series connected hydraulic motors can be driven at different rates to steer the outer end of the ramp during expansion and retraction movement, a single actuator joy stick control lever for controlling both steering and driving rate of the outer end of the ramp, and selsyn transmitter means operably connected to such control lever for actuation thereby, and selsyn receiver means operably connected to the selsyn transmitter means and to the first and second valves for operating the valves in response to actuation of such control lever.

5. The apparatus of claim 4 wherein the first and second valves are closed center rotary spool valves.

6. The apparatus of claim 1 further including a third valve connected in the hydraulic circuit means, the third valve being operable to reverse the direction of flow of hydraulic fluid through one of the hydraulic motors whereby the two hydraulic motors and the wheels connected thereto are driven in opposite directions to pivot the undercarriage about a vertical axis spaced midway between the pair of wheels.

7. The apparatus of claim 6 wherein the third valve is a solenoid actuated two-position four-way valve connected to provide a hydraulic circuit to one of the hydraulic motors, the solenoid actuated valve being normally spring-biased to one position to provide normal flow through the hydraulic motor and solenoid actuated to the another position to reverse the flow of hydraulic fluid through such hydraulic motor.

8. The apparatus of claim 7 wherein the first and second valves are closed center rotary spool valves.

* * * * *

UNITED STATES PATENT AND TRADEMARK OFFICE
CERTIFICATE OF CORRECTION

PATENT NO. : 4,318,197
DATED : March 9, 1982
INVENTOR(S) : OTTO DROZD

It is certified that error appears in the above-identified patent and that said Letters Patent are hereby corrected as shown below:

Col. 10, line 36, "1" should be --4--;

line 50, after "to" delete "the".

Signed and Sealed this

Fifteenth Day of June 1982

[SEAL]

Attest:

GERALD J. MOSSINGHOFF

Attesting Officer  Commissioner of Patents and Trademarks